United States Patent [19]

Lindgren

[11] Patent Number: 4,562,509

[45] Date of Patent: Dec. 31, 1985

[54] SAFETY SWITCH

[75] Inventor: Bengt Lindgren, Sollentuna, Sweden

[73] Assignee: Termofrost Sweden AB, Spanga, Sweden

[21] Appl. No.: 586,127

[22] Filed: Mar. 5, 1984

[51] Int. Cl.$^4$ ............................................. H02H 3/16
[52] U.S. Cl. ..................................... 361/104; 361/55; 219/509; 219/203; 219/522
[58] Field of Search ........................... 361/55, 56, 104; 219/522, 203, 501, 541, 543, 509

[56] References Cited

U.S. PATENT DOCUMENTS 3,573,550  4/1971  Baker, Jr. ............................... 361/56
3,878,434  4/1975  Voorhoeve ......................... 361/91 X
3,941,975  3/1976  Newman et al. ................. 361/104 X

FOREIGN PATENT DOCUMENTS 962758  2/1975  Canada .................................. 361/55

Primary Examiner—Patrick R. Salce
Attorney, Agent, or Firm—LeBlanc, Nolan, Shur & Nies

[57] ABSTRACT

A safety switch for a glass door, which is used for refrigerating and deep freeze chambers and comprises two or more glass panes of hardened glass, of which the front pane (21) remote from the refrigerating and deep freeze chamber is heated by an electrically conductive layer attached on the inner surface of the pane, which layer is connected to an upper and, respectively, lower collecting conductor, and the rear pane (22) facing to the refrigerating and deep freeze chamber is provided with at least one conductor attached on the pane. The conductors are connected to a current scanning device (20), which is capable to scan whether current flows through said collecting conductors and the conductor of the rear pane, and which is capable to break the connection between the conductors of the two panes (21,22) and a voltage source (46) in the event that current does not flow in the collecting conductors and/or in the conductor of the rear pane. According to the invention, the current scanning device comprises a per se known type of fuse (21) of porcelain, on which conductors are located. The current scanning device (20) is capable to increase the current intensity through said fuse (21) in the event that current does not flow in the collecting conductors and/or in the conductor of the rear pane, whereby the porcelain fuse (21) is heated so as to crack, whereby the conductors on the fuse (21) are broken.

1 Claim, 3 Drawing Figures

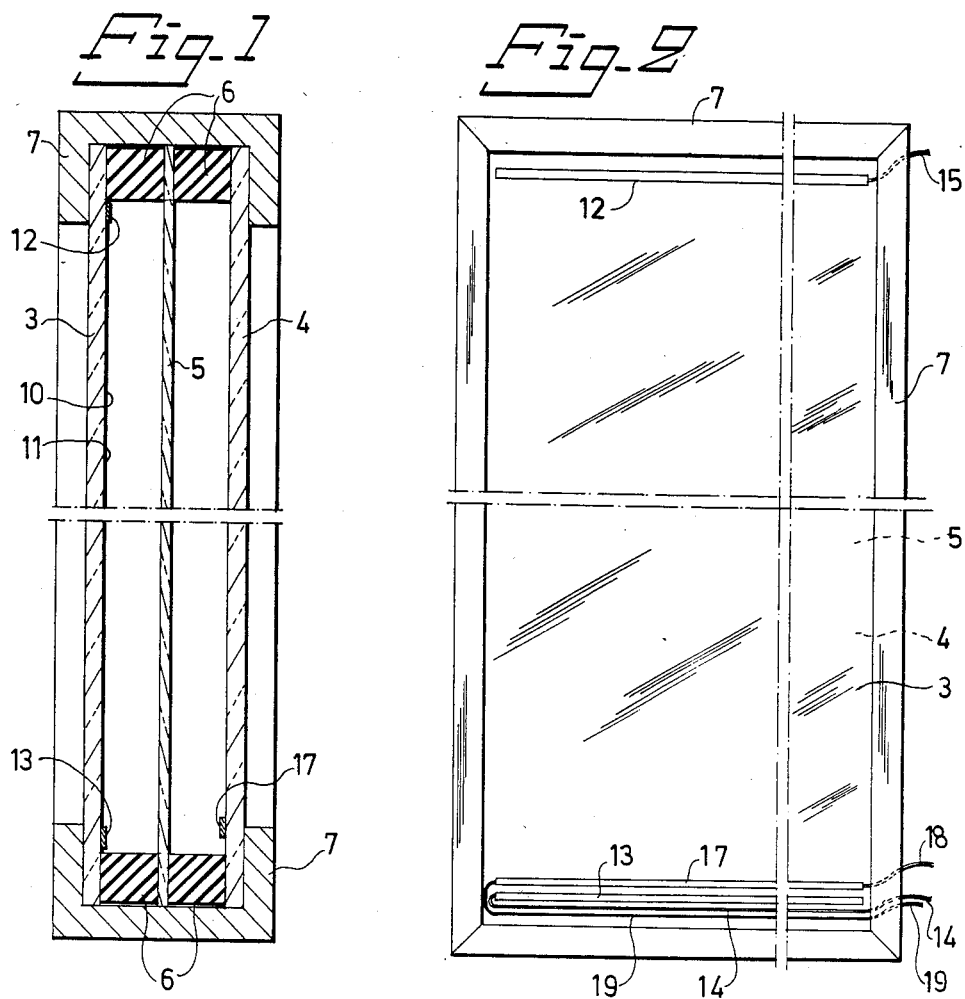
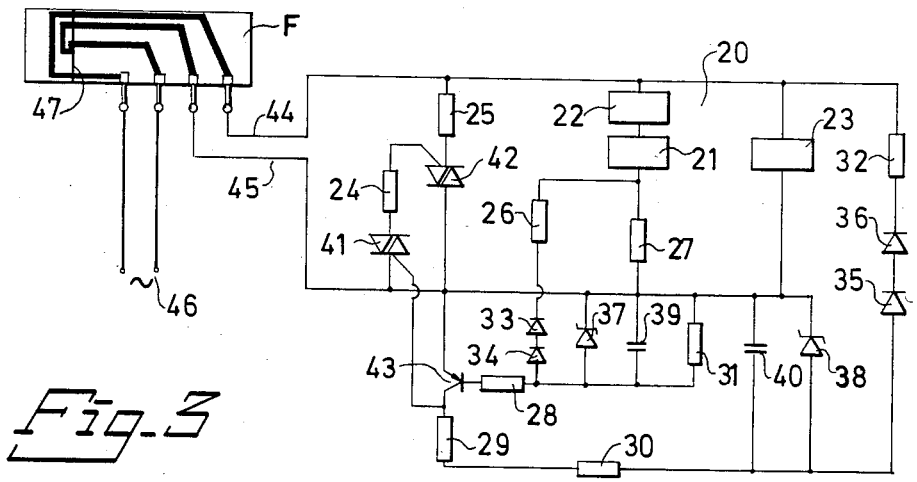

SAFETY SWITCH

This invention relates to a safety switch for glass doors used for refrigerating and deep freeze chambers in the everyday commodities trade, especially in food shops.

Such a device is described in Swedish patent application No. 8205534-4; which was provisionally published on Aug. 7, 1984.

The aforesaid doors are to an ever increasing extent used for shielding off refrigerating and deep freeze chambers from the remaining space in food shops. Through the glass doors, refrigerated and deep-frozen goods are exposed. A customer intending to select a goods opens the door, takes the goods and closes the door.

The door by being opened frequently are exposed alternatingly to the climate of the shop and to the climate of the refrigerating and deep freeze chamber.

As the doors alternatingly are exposed to different climates in respect of relative humidity and temperature, the glass pane facing to the shop normally is heated in order to prevent vapour formation thereon, so that the goods always are clearly exposed. In some cases, also the glass pane facing to the refrigerating or deep freeze chamber is heated.

The heating is effected in that the pane is coated with an extremely thin layer of an electrically conductive material, for example stannic oxide, and in the upper and, respectively, lower part of the pane the layer is connected to collecting conductors, which in their turn are connected to regular mains voltage. The effect development over the pane can be, for example, about 80 $W/m^2$.

One problem arising increasingly was found to be that customers with the trolleys, in which they collect the goods in the shop, occasionally drive against the doors and that as a result thereof the hardened glass breaks, Such incidents occur with doors both in closed and in open position, which implies that the door pane facing to the shop and also the door pane facing to the refrigerating or deep freeze chamber can be hit and smashed by a trolley.

As the trolleys are made of metal, and mains voltage is connected to the front pane of the door, there is risk that the customer in question can be exposed to mains voltage which, of course, can result in serious accidents.

These accidents are eliminated by the invention according to the Swedish patent referred to above.

The invention according to said patent relates to a safety device for a glass door used for refrigerating and deep freeze chambers, which door comprises two or more glass panes of hardened glass, of which panes the front pane remote from the refrigerating and deep freeze chamber is heated by an electrically conductive layer, which is attached on the inside of the pane and connected to an upper and, respectively, lower collecting conductor, which in their turn are connected to a voltage source. The invention is characterized in that said collecting conductors are connected to a current scanning device, that the rear pane facing to the refrigerating or deep freeze chamber is provided with at least one conductor, which is attached on the pane and also connected to said device, that said device is capable to scan whether current flows through said collecting conductors and the conductor of the rear pane, and that said device is capable to break the connection between the conductors of the two panes and the voltage source in the event that current does not flow in the collecting conductors and/or in the conductor of the rear pane.

One problem arising at certain types of such doors is caused by the desire to have all electronics mounted in the frame of the door. The problem is due to the fact that it is not possible to mount a current-breaking relay of sufficient size in the frame. There further exists a requirement that the breaking distance at the breaking of the current circuits shall be at least 3 mm.

The present invention relates to a design of the aforesaid device for breaking the connection between the conductors of the two panes and the voltage source in the event that current does not flow in the collecting conductors and/or in the conductor of the rear pane.

The present invention, thus, relates to a safety switch of the aforesaid kind, which is characterized in that the current scanning device comprises a per se known type of fuse of porcelain, on which conductors are located, and that the current-scanning device is capable to increase the current intensity through said fuse in the event that current does not flow in the collecting conductors and/or in the conductor of the rear pane, and the porcelain fuse is heated so as to crack, whereby the conductors on the fuse are broken.

In the following, parts of the disclosure in the aforesaid Swedish patent are described briefly, and also the present invention is described, with reference to attached drawing, in which FIG. 1 is a cross-section of a door, to which the invention is applied, and FIG. 2 is a horizontal view of said door.

FIG. 3 shows by way of example a schematic circuit diagram, in which a fuse according to the present invention is comprised.

The accompanying FIGS. 1 and 2 are taken from said Swedish patent and show a door 1 with a front glass pane 3 facing to the shop, a rear pane 4 facing to the refrigerating or deep freeze space, and an intermediate pane 5. The front pane 3 and rear pane 4 are of hardened glass while the intermediate pane 5 is of window glass. The panes 3,4,5 are insulated from each other by insulation 6 and are surrounded by a metal frame 7. The doors 1 normally are mounted in a case 8 of metal and are provided with a handle 9 of metal.

As mentioned above in the introductory portion, the front pane 3 often is heated in that electric current passes through an electrically conductive layer 10 over the inner surface 11 of the front pane 3. The conductive layer 10 is connected to an upper and a lower collecting conductors 12 and, respectively, 13.

From the collecting conductors 12, 13 a connecting conductor 14,15 (shown schematically) extend to a current source 16 with mains voltage, which in Sweden is 220 V, 50 cps. The connecting conductors 14,15 preferably run in the frame 7.

The said collecting conductors 12,13 are connected to a current scanning device. The rear pane 4 further is provided with at least one conductor 17, which is attached on the pane and also connected to said device. The current scanning device is capable to scan whether current flows through the collecting conductors 12,13 and through the conductor 17 of the rear pane 4, and is capable to break the connection between the conductors 12,13;17 of the two panes 3,4 and the voltage source in the event that current does not flow in any of the conductors 12,13;17 of the panes.

As the front pane 3 and rear pane 4 are of hardened glass, they crackle substantially when being subjected to too high load. At such crackling the current paths 12,13,10;17 rigidly attached on the panes 3,4 are broken.

The conductor 17 on the rear pane 4 can be of the same type as the conductors used for burglar larm purposes on display windows and the like, i.e. a thin conductor 17 attached to the pane. The conductor preferably runs across the width of the pane 4 and is connected to the voltage source via connecting conductors 18,19.

According to a second embodiment, the rear pane 4 is provided with a conductive layer and collecting conductors in a way corresponding to the front pane 3. In this case the collecting conductors are connected to said device.

The present invention relates, as mentioned above, to the design of the current scanning device and particularly to that part of the current scanning device which is capable to break the connection between the conductors of the two panes and the voltage source.

In addition to the requirement, as mentioned, that said lastmentioned part shall break the connection with a break length of at least 3 mm, the current shall be broken bipolar.

In FIG. 3 a schematic circuit diagram is shown by way of example which preferably is realized as a hybrid circuit and constitutes said device 20. With said device 20 a porcelain fuse F of a kind known per se is associated which consists of a thin porcelain disc, on which electric conductors are attached, from which contact pins project. In FIG. 3 the numeral 22 designates the front pane 3, the numeral 22 the rear pane 4, and the numeral 23 the heating conductor of the door case 7. The numerals 24-32 designate resistors, the numerals 33-38 diodes, the numerals 39-40 capacitors, and the numerals 41 and 42 so-called triacs. The numeral 43 designates a transistor. This circuit, of course, can be built up in different ways for achieving the function desired, viz. to bring about an increase in the current intensity in the conductors 44,45 extending from the voltage source to the device 20, in the event that one of the glass panes 3,4 crackles.

The function of the circuit briefly is as follows. When a pane 22,21 crackles, the potential on the right-hand side of the transistor 43 changes so that the transistor 43 closes. Hereby the triac 41 is opened whereby also the triac 42 opens. Due to the opening of said last-mentioned triac 42, the resistance in the circuit 20 drops so that a substantial increase in current in the circuit 44,25,42,45 occurs.

The current scanning device 20, thus, operates in such a manner that the current through the conductors 44,45 from the voltage source 46 increases when the load in the form of the conductors of the panes 3,4 ceases. The increase in current gives rise to a substantial heat development in the porcelain fuse, which is designed so as to be provided with a mechanical weakening in the form of a marking, a V-shaped groove 47 or the like. The heat development is concentrated to the groove 47, which in its turn due to thermal stresses in the porcelain causes the porcelain fuse F to be divided along the groove 47. Hereby the current between the voltage source 46 and the panes 3,4 is broken. The conductors on the porcelain fuse have such a distance relative to each other that thereby the current circuit is broken bipolar with a break length of at least 3 mm.

The porcelain fuse F is shown in FIG. 3 to be of about natural size. The device 20 as hybrid circuit has small dimensions, and the entire arrangement, therefore, easily is included in the case of each door.

The present invention must not be regarded restricted to the embodiments described above, but can, as the porcelain fuse and the circuit 20 are concerned, be varied in many ways within the scope of the invention idea.

The present invention, therefore, must not be regarded restricted to the embodiments described above, but can be varied within the scope of the attached claims.

I claim:

1. A safety switch, for a glass door, comprising a current scanning device connected to the conductors of an alternating voltage source, said glass door, being used for refrigerating and deep freeze chambers and comprising two or more glass panes of hardened glass, of which the front pane remote from the refrigerating and deep freeze chamber is heated by an electrically conductive layer attached on the inner surface of the pane, which layer is connected to an upper and, respectively, lower collecting conductor, and the rear pane facing to the refrigerating and deep freeze chamber is provided with at least one conductor attached on the pane, all of said which conductors being connected to said current scanning device, which is capable to scan whether current flows through said collecting conductors and the conductors of the rear pane and is capable to break the the connection between the conductors of the two panes and the alternating current voltage source in the event that no current flows in the collecting conductors and/or in the conductor of the rear pane, characterized in that the current scanning device (20) comprises a fuse (F) of porcelain, on which bi-polar conductors from the voltage source are located, that the current scanning device (20) is capable to increase the current intensity through said fuse (F) in the event that current does not flow in the collecting conductors (12, 13) and/or in the conductor (17) of the rear pane (4), and said porcelain fuse (F) thereby is heated so as to crack, whereby the bi-polar conductors on the fuse are broken, in a bi-polar manner so that on the fuse of porcelain where the bi-polar conductors connected to the voltage source (46) are located, the bi-polar conductors have a spacing distance between each other at the break point (47) of the fuse sufficient for a complete non-conductive break of each of the alternating voltage bi-polar conductors, which for a 220 Volt A.C. source should be at least 3 mm.

* * * * *